May 2, 1967

V. MORRILL, JR 3,317,083

APPARATUS AND METHOD FOR MAKING ACCURATE MICRO-MEASUREMENTS
AND FOR DISPENSING ACCURATELY MEASURED
SMALL QUANTITIES OF LIQUIDS

Filed May 27, 1965

INVENTOR
VAUGHAN MORRILL, JR.

BY
Kane, Dalsimer, Kane + Smith
ATTORNEYS

May 2, 1967  V. MORRILL, JR  3,317,083
APPARATUS AND METHOD FOR MAKING ACCURATE MICRO-MEASUREMENTS
AND FOR DISPENSING ACCURATELY MEASURED
SMALL QUANTITIES OF LIQUIDS
Filed May 27, 1965  4 Sheets-Sheet 2
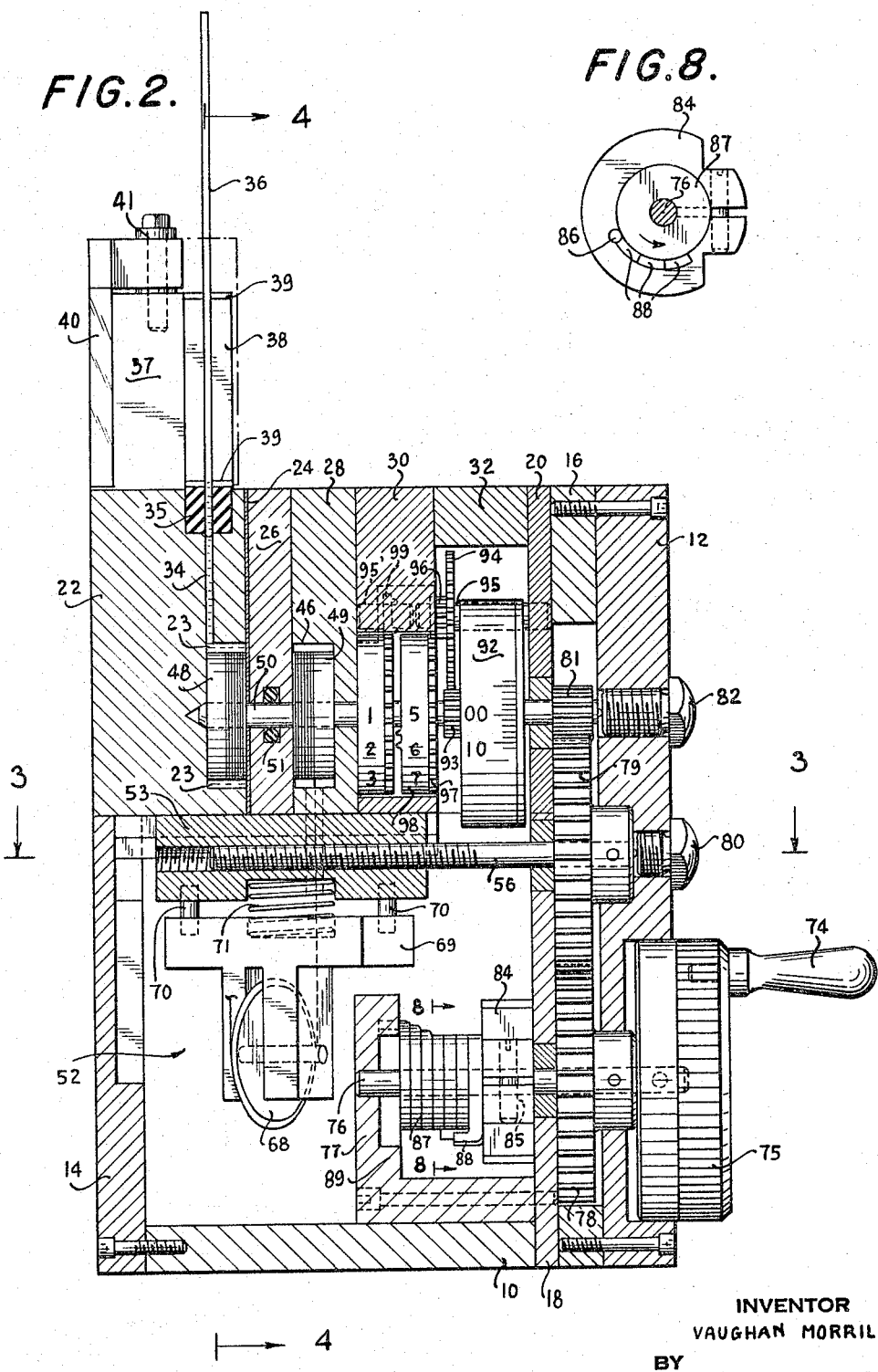
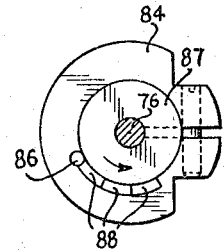
INVENTOR
VAUGHAN MORRILL, JR.
BY
Kane, Dalsimer, Kane, + Smith
ATTORNEYS

INVENTOR
VAUGHAN MORRILL, JR.

BY
Kane, Dalsimer, Kane + Smith
ATTORNEYS

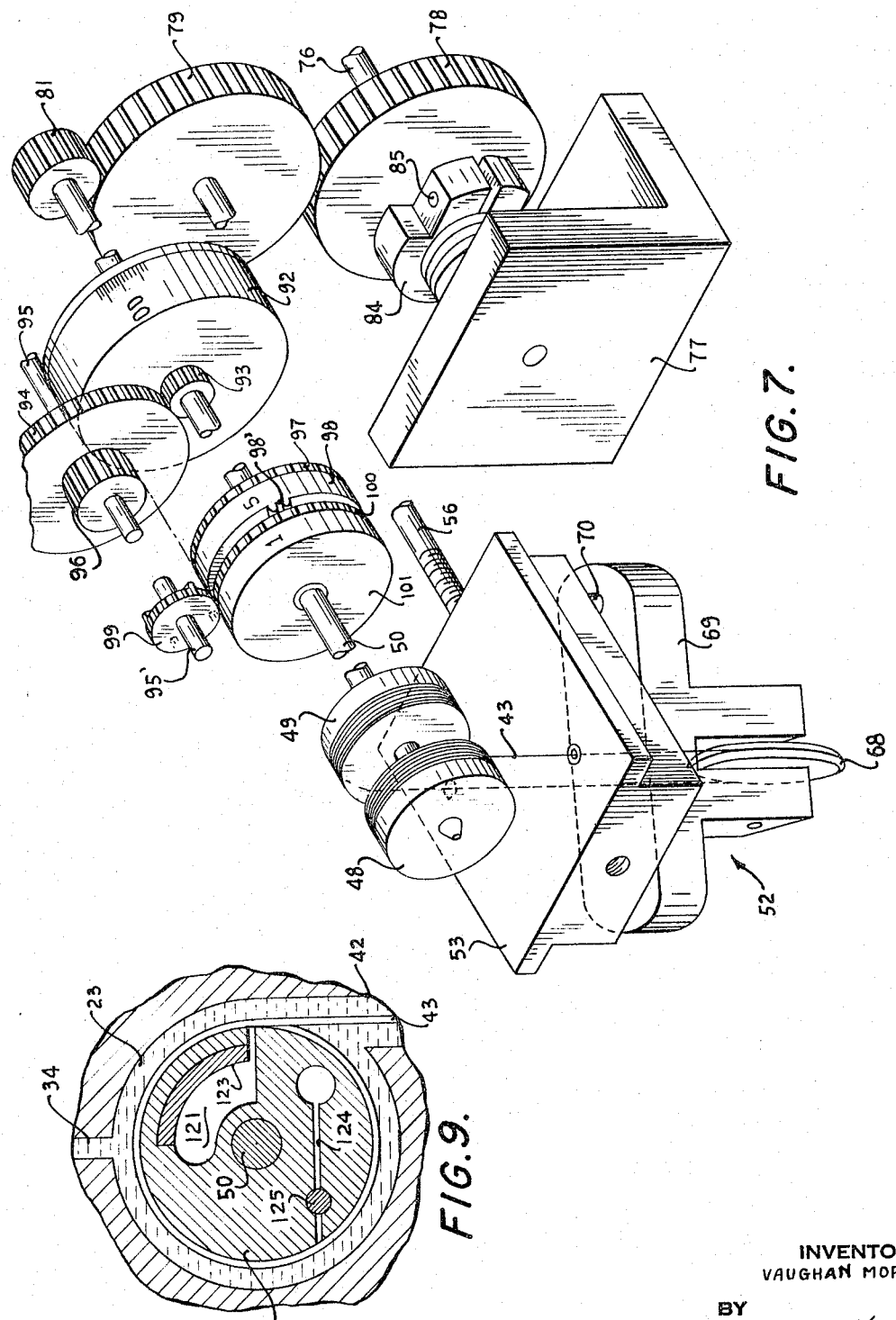

United States Patent Office 3,317,083
Patented May 2, 1967

3,317,083
APPARATUS AND METHOD FOR MAKING ACCURATE MICRO-MEASUREMENTS AND FOR DISPENSING ACCURATELY MEASURED SMALL QUANTITIES OF LIQUIDS
Vaughan Morrill, Jr., Creve Coeur, Mo.
(26 S. Spoede, St. Louis, Mo. 63141)
Filed May 27, 1965, Ser. No. 459,278
10 Claims. (Cl. 222—1)

This invention relates to an improved apparatus and method useful in making accurate micro-measurements and in dispensing accurately measured small quantities of liquids.

The invention is particularly useful in accurately testing and gauging the volumetric capacity of small bore tubing such as capillary tubing and also various liquid dispensing, mixing, analyzing and testing instruments such as pipettes. It also may be used in collecting and dispensing accurately measured, small or micro-quantities of liquid.

Apparatus and methods have heretofore been provided for testing and gauging the volumetric capacity of tubing and of various instruments.

However, the apparatus and methods heretofore available have presented various difficulties and disadvantages. Thus, certain of the apparatus and methods have been cumbersome and complex in design and construction. Also, some of the apparatus and methods have been difficult to operate and did not uniformly and accurately measure and dispense micro-quantities of liquids. Still other apparatus were unduly fragile or were readily subject to wear, damage or breakage in use.

It is a prime object of the present invention to overcome the difficulties and disadvantages heretofore encountered and to provide an improved apparatus and method useful in making accurate micro-measurements and in dispensing accurately measured small quantities of liquid in which the apparatus is of relatively simple design and is simple to use and operate to accurately measure or dispense micro-quantities of liquids and which is of rugged construction so as to give prolonged service with repeated operations with comparative freedom from wear, damage and breakage.

My invention contemplates the provision of an improved apparatus and method wherein a relatively elongated, flexible, relatively inelastic filament having substantially uniform cross-sectional dimensional characteristics throughout its effective length is fed into a chamber containing a liquid in accurately measured lengths and is accumulated therein so as to displace from the chamber a volumetric quantity of liquid exactly equal to the volumetric quantity of the measured length of wire.

In a preferred embodiment of the invention, I provide a drum-like reel within the chamber for feeding an accurately measured length of wire into the chamber and accumulating the wire on the reel. I also provide a second reel outside the chamber for withdrawing the wire from the chamber and accumulating it thereon. Filament guide means is preferably provided in the path of the filament between the drums, and the guide means is shifted longitudinally of the drums as they are rotated so as to guide the filament on to said drums so that the filament is accumulated thereon in non-overlapping relationship.

In the accompanying drawings:

FIG. 2 is a longitudinal, sectional view in the direction of the arrows on the line 2—2 of FIG. 1;

FIG. 7 is an exploded view on an enlarged scale showing the filament feeding mechanism, the filament guiding mechanism, the indicator and the gear train for operating the feeding mechanism and the indicator;

Figure 1:
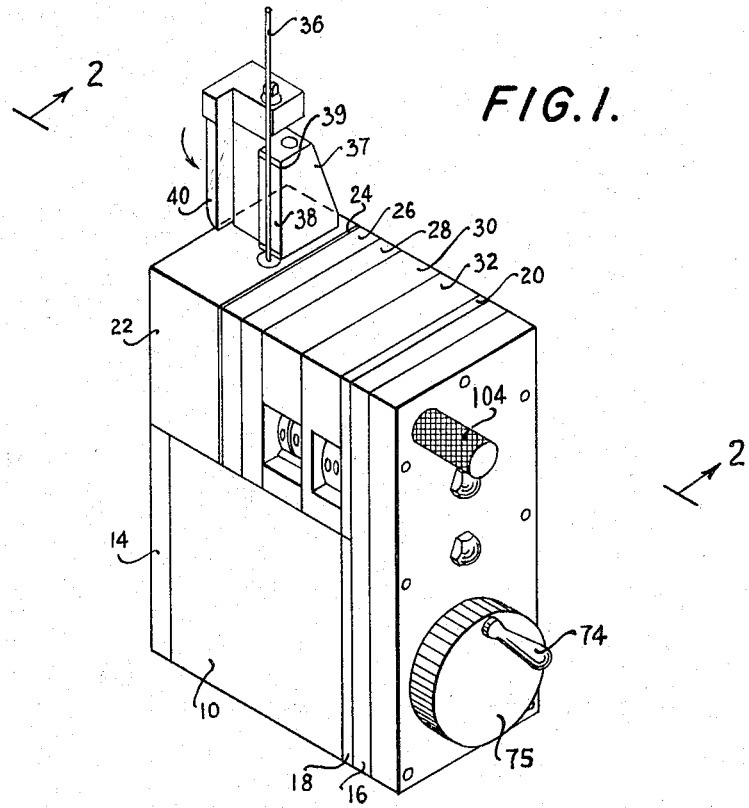
FIG. 1 is a perspective view of apparatus embodying my invention.
Figure 3:
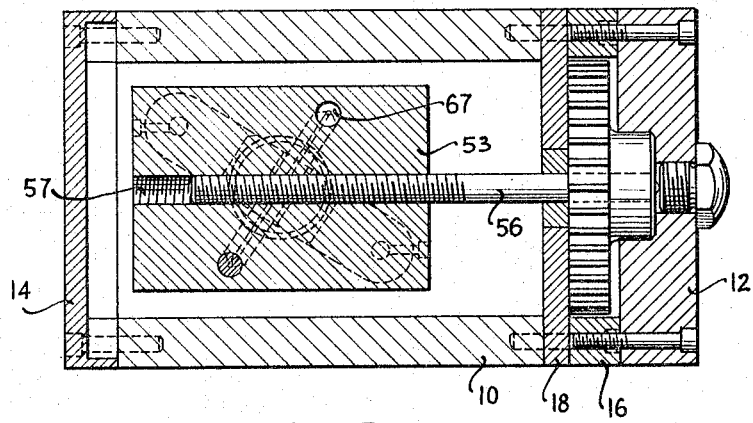
FIG. 3 is a cross-sectional view in the direction of the arrows on the line 3—3 of FIG. 2.

FIG. 8 is a detailed, sectional view in the direction of the arrows on the line 8—8 of FIG. 2 showing the stop mechanism for stopping the operation of the apparatus when it has been rotated to the limit of operation in either direction; and FIG. 9 is a detailed, cross-sectional view through the liquid chamber showing the construction of a modified form of feeding drum having an automatic temperature compensator for automatically maintaining a uniform drum diameter with normal temperature variations.

Referring more particularly to FIGS. 1–4, my apparatus includes a suitable casing assembly. The form of the casing may, of course, vary. In the illustrated embodiment, the casing comprises a U-shaped base portion 10 extending across the bottom of the apparatus and a little more than half way up the front and back faces thereof.

One end of the base portion is closed by the plate 14 and the opposite end is closed by the plate 18. Secured to the outside of the plate 18 are the two plates 12 and 16 which extend for the full length of the casing. Above the plate 18 and extending to the top of the casing is the plate 20.

Above the end plate 14 and overlapping the U-shaped base portion 10 is the relatively thick plate or block 22 which houses the liquid chamber 23. Immediately adjacent the block 22 so as to seal the liquid chamber is the gasket 24 made of suitable sealing material such as synthetic rubber, Teflon or some other suitable plastic material. Thereafter, arranged in sequence are the plates 26, 28, 30 and 32.

The various parts of the casing are preferably made of a suitable, strong and corrosion-resistant material, such as aluminum or bronze, or preferably stainless steel.

As stated above, the liquid chamber 23 is formed in the plate or block 22. The size of the chamber may vary, but, since my apparatus is particularly suitable for measuring or dispensing micro-quantities of a liquid, a relatively small chamber having a capacity of one-half cc. or less when the drum-like reel is disposed therein is generally adequate. Extending through block 22 in a generally vertical direction from the inside of the chamber to the outside thereof is the liquid discharge passageway 34. At the upper end thereof, the liquid discharge passageway is enlarged as shown, and a suitable sealing ring 35 made of Teflon, synthetic rubber or the like is tightly fitted therein. The opening in sealing ring 35 is large enough to accommodate the lower end of a capillary tube 36 and form sealing engagement therewith. The capillary tube is inserted therein for the purpose of testing or checking the volumetric capacity or bore size thereof.

Figure 4:
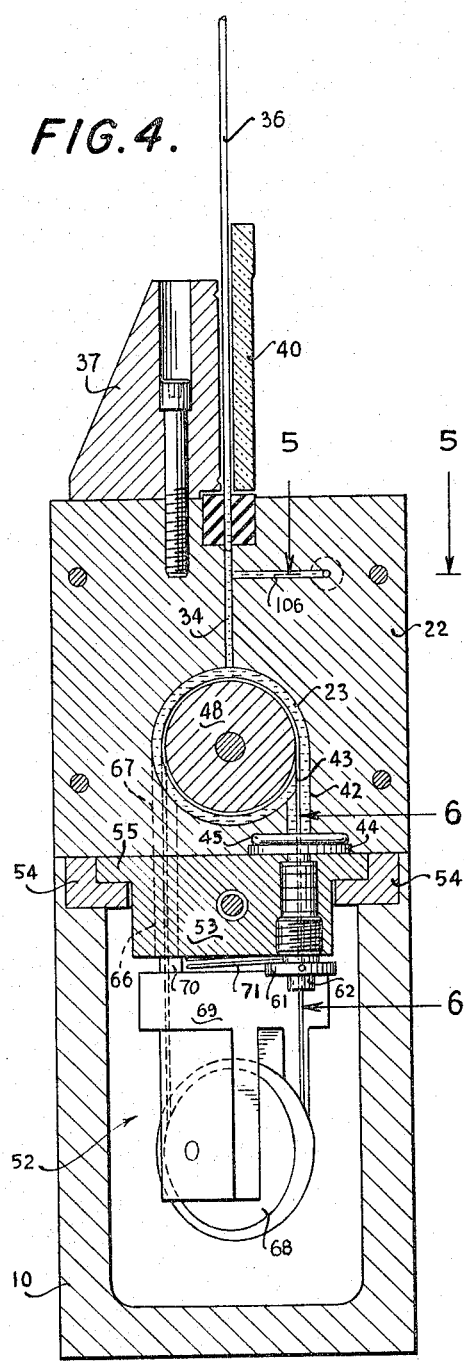
FIG. 4 is a longitudinal, sectional view at right angles to the view shown in FIG. 2 and in the direction of the arrows on the line 4—4 of FIG. 2.

Instead of capillary tubing 36, the lower end of a pipette or other instrument may be inserted in the ring 35 in sealing engagement therewith, and for this purpose the size of the opening in the ring 35 is adjusted to accommodate the lower end of the instrument. Where the apparatus is used for dispensing or collecting accurately measured small quantities of a liquid, then, instead of capillary tubing or an instrument, a tip or nozzle may be inserted in the ring 35.

Where the apparatus is used for measuring the volumetric capacity or bore size of tubing, I preferably provide a suitable bracket 37 on the top of the casing immediately adjacent the orifice of liquid discharge passageway 34. Supported on the bracket in alignment with the area where the capillary tubing projects is a gauge 38 having markings 39 defining an accurately measured length, as for instance one inch. So as to facilitate the reading of the gauge and the determination of when the tubing has exactly the measured length of liquid therein, I preferably provide a magnifying glass 40 which is pivotally mounted at 41 so that it may be swung from an inoperative position to one side of the tubing, as shown in FIGS. 1 and 2, or to an operative position in alignment with the tubing and gauge, as shown in FIG. 4.

Figure 6:
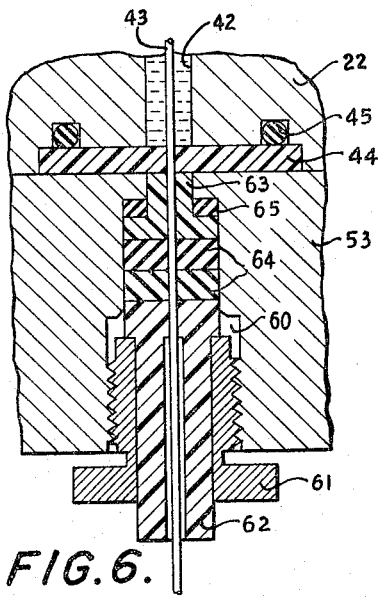
FIG. 6 is a detailed view on an enlarged scale in the direction of the arrows on the line 6—6 of FIG. 4 showing the guide channel, packing and the piston or filament extending through the guide channel into the chamber.

Extending through the block 22 in a generally vertical direction at the lower portion thereof from the outside to the inside of the chamber is the channel 42 through which the filament 43 extends. The lower end of guide channel 42 at the surface of block 22 is enlarged, as most clearly shown in FIG. 6, so as to accommodate the sealing block 44 made of Teflon, synthetic rubber or some other suitable plastic sealing material. The sealing block 44 has a central opening in registry with the lower end of channel 42, as shown, and both the channel and the opening are large enough to permit the filament to be shifted transversely when it is wound upon the block-like reel as will be later explained. The outer surface of sealing block 44 is flush with the lower surface of block 22 so as to ensure sealing engagement between the sealing block and the block or plate 22. I preferably provide a circular recess in plate 22 which accommodates an O-ring 45 which provides a seal between the plate 22 and sealing block 44.

Filament 43 serves as a piston. A portion of the filament is disposed in liquid chamber 23 and it extends outwardly therefrom through guide channel 42. Another portion of the filament is disposed on the outside of the liquid chamber and specifically is accumulated in chamber 46 formed in plate 28.

As previously explained, filament 43 is flexible and relatively inelastic and has substantially uniform dimensional characteristics throughout its effective length. By effective length, I mean the longitudinal extent of the filament which at times is disposed outside the liquid chamber and is drawn inwardly into the chamber to displace liquid therefrom.

The filament or piston is drawn into the liquid chamber in accurately measured lengths and is accumulated therein so as to displace from the chamber a volumetric quantity of liquid conforming exactly with the volumetric quantity of the filament which is drawn into the chamber and accumulated therein. Thus, by drawing an accurately measured length of filament into the chamber an exact quantity of liquid can be displaced upwardly through the liquid discharge passageway 34 into the capillary tube 36. Through this means the volumetric capacity of the tubing for a measured length and also the size of the bore in the tubing can be accurately measured and determined.

In order to draw accurately measured lengths of filament into and out of the chamber 23 and in order to accumulate the filament inside or outside the chamber, I provide suitable filament feeding mechanism which in the illustrated embodiment takes the form of the drum-like reels 48 and 49 mounted on the common shaft 50 so as to rotate therewith. The measuring drum or reel is disposed in liquid chamber 23 and the rewind drum or reel 49 is disposed in the rewind chamber 46. The shaft 50 extends through the several plates and has a bearing support in plate 20 and also is supported in plates 28, 26 and 22. Since the shaft extends from the outside to the inside of liquid chamber 23, suitable means are provided to prevent leakage of the liquid from inside the chamber along the shaft. Thus, the shaft extends through gasket 24, and furthermore an O-ring 51 is preferably provided in a groove in plate 26 surrounding the shaft 50.

Figure 5:
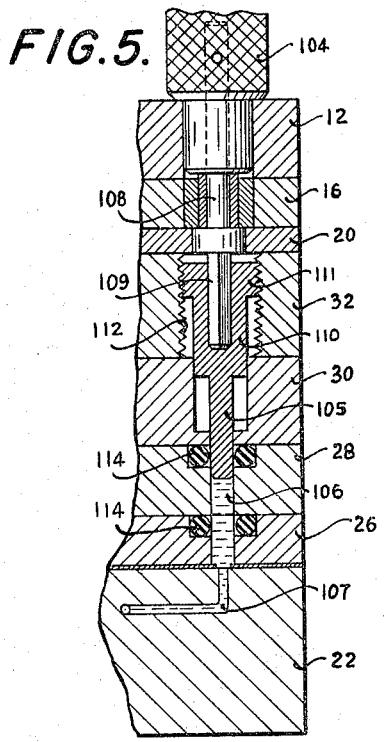
FIG. 5 is a detailed, sectional view on an enlarged scale in the direction of the arrows on the line 5—5 of FIG. 4 showing the liquid compensating mechanism for adjusting the quantity of liquid in the chamber and in the liquid outlet passageway.

By accurately relating the diameter of the filament with the diameter of the drums or reels, predetermined unit quantities of liquid can be displaced from the liquid chamber upon each rotation of the drum. The liquid level is adjusted to a zero calibration mark 39 by rotating knurled handle 104 on the compensating mechanism FIG. 5, as hereinafter described. The quantity of liquid displaced can then be determined without recourse to the dimensions of the liquid chamber 23 or the liquid discharge passageway 34. Thus, with a filament diameter of 0.006 inch and a drum diameter of 0.6865 inch, one micro-liter of liquid is displaced from the chamber upon each rotation of measuring drum 48 to draw wire into the chamber. Under these given dimensions, a little over two inches of filament are drawn into the chamber on each rotation.

The filament 43, as indicated above, should be flexible and relatively inelastic and should also be unaffected by the liquid disposed in the chamber. For this purpose, I prefer to use a non-corrosive metal wire, such as stainless steel wire.

In the path of travel of the filament between the measuring drum 48 in liquid chamber 23 and the rewind drum 49 in rewind chamber 46, I preferably provide suitable filament guiding mechanism such as shown generally at 52 in FIGS. 2, 4 and 7. The rewind mechanism serves to maintain the filament under uniform tension below the elastic limit of the wire and also to guide the wire longitudinally of the drums as the wire is wound thereon so as to prevent overlapping of the wire on the drums. It will be appreciated that overlapping of the wire would interfere with the feeding of accurately measured lengths of the wire upon each rotation of the drum.

The guide mechanism comprises a slide plate 53 mounted beneath the plates 22, 26, 28 and 30 for slide movement in a direction transversely of the casing and longitudinally of the drums and shaft 50. Slide plate 53 is held in engagement with the lower surface of the plates 22, 26, 28 and 30 and in sealing engagement with the sealing block 44 by means of angle brackets 54 mounted inside the U-shaped base portion 10 in engagement with the laterally projecting flanges 55 formed on the slide plate.

The slide plate is caused to shift transversely of the casing by means of screw threaded shaft 56 in threaded engagement with the internally threaded aperture 57 formed in the slide plate. The shaft 56 is suitably supported in a bearing in plate 18 as shown in FIG. 2 and is caused to rotate simultaneously with shaft 50 by means of a train of gearing which will be hereinafter explained. When shaft 56 is rotated in one direction, slide 53 will be shifted to the left and when it is rotated in the opposite direction slide 53 will be shifted to the right.

The slide is made of a corrosion resistant material which can withstand friction without excessive wear, and for this purpose I prefer to make the slide of stainless steel.

The guide channel 42 for guiding the filament into the liquid chamber 23 is continued downwardly through the slide block 53. Thus, as shown most clearly in FIG. 6, a passageway 60 extends through the slide block 53 in registry with the channel 42. The upper end of the passageway 60 is of the same diameter as the channel 42 and the aperture through Teflon sealing block 44. The central area of passageway 60 is of greater diameter and the lower end of the passageway is of still larger diameter. Within the passageway, I provide suitable packing material which is held in place by gland 61 having threaded engagement with the lower portion of passageway 60. The gland 61 is made of a suitable corrosion-resistant material, such as stainless steel or brass.

The packing material contained in the passageway 60 serves the purpose of sealing the liquid in the chamber and of preventing contaminants from entering into the chamber. It will be seen that it wipes the liquid from the filament as it is drawn outwardly from the chamber and it wipes contaminants from the filament as it is drawn inwardly into the chamber.

The nature and arrangement of the packing material may vary, but under any circumstances it should have sealing-wiping engagement with the filament. In the illustrated embodiment, I have provided a sleeve 62, preferably made of nylon, extending upwardly from the lower end inside the gland 61 and having an enlarged flange portion in engagement with the upper end of the gland. At the upper end of the passageway, I have provided another sleeve 63 having an enlarged head at its lower end and this sleeve is preferably made of suitable material such as Teflon. Between the heads of the sleeves 62 and 63, I provide a pair of ring washers 64 made of an elastomeric material, such as rubber or synthetic rubber, preferably Neoprene. Above the head of sleeve 63 and in sealing engagement between the sleeve and the shoulder in passageway 60 is another ring washer 65, preferably made of similar material to the washers 64.

When the filament is threaded through the passageway and guide channel with the packing material assembled therearound in the sequential order indicated, the gland 61 is tightened so as to compress the several elements of the packing material into sealing engagement so that the sleeve 63, the head of the sleeve 62 and the elastomeric washers 64 will have sealing-wiping engagement with the filament and sealing engagement with the sides of the passageway. Since slide plate 53 has sealing engagement with the Teflon sealing block 44, it will be seen that the liquid chamber will be effectively sealed against leakage of the liquid contained therein and will also be sealed against the entry of contaminants.

Slide block 53 is also formed with guide aperture 66 in registry with guide aperture 67 which extends upwardly from the lower end of plate 28 into rewind chamber 46 containing rewind drum 49. The guide channel 67 should be of sufficient diameter so that as the slide block 53 is slid longitudinally of the reel 49 it will guide the filament thereon in helical, non-overlapping relationship. The filament guiding mechanism also includes a pulley 68 around which the filament is guided in its path of movement between the drum-like reels 48 and 49. Pulley 68 is rotatably mounted upon bracket 69 which in turn is supported on slide 53 so as to exert adequate tension on the filament to ensure that the filament will be uniformly wound upon the drum-like reels without any slack. In this connection, the tension should be lower than the elastic limit of the filament so as not to exert any attenuating effect thereon.

The connection between slide plate 53 and bracket 69 consists of a pair of spaced guide and limit pins 70 engaging in registering spaced apertures formed in the lower surface of slide 53 and the upper surface of bracket 69 and also helical spring 71 extending between the central portion of the slide and the bracket. The opposite ends of the spring are preferably disposed in wells or recesses in the slide and bracket as shown.

The filament is threaded around pulley 68 and thence through the guide channels in the slide and in plates 22 and 28 into the liquid chamber and the rewind chamber where the ends of the filaments are secured to the drum-like reels as by being extended through apertures formed therein. They are then wound upon the reels in opposite relationship until spring 71 is partially compressed so as to exert a tension thereon less than the elastic limit of the filament. It will be seen that the filament then holds the pulley assembly in position and that the spring exerts the necessary uniform tension on the pulley and filament and also presses the slide plate into sealing engagement with the Teflon sealing block 44.

When the shaft 50 is rotated in one direction, the filament will be wound on drum 48, thereby drawing a measured amount of the filament into the liquid chamber 23 and accumulating it therein. When shaft 50 is rotated in the opposite direction, it will wind the filament on rewind drum 49, thus drawing the filament out of the liquid chamber 23 and into the rewind chamber 46.

Due to the provision of the slide block and the filament guiding and tensioning mechanism, the filament will be uniformly wound on the drumlike reels in helical, non-overlapping relationship. Also, due to the provision of the sealing block 44, slide 53 and the packing material, the chamber is effectively sealed from loss of liquid or from entry of contaminants therein.

I also provide suitable rotating or operating mechanism to cause the synchronized rotation of shafts 50 and 56. In the illustrated embodiment, this takes the form of crank handle 74 mounted on disc 75, which in turn is keyed to shaft 76 journaled in plates 12 and 18 and in supporting bracket 77 mounted inside the casing. Keyed to shaft 76 is a large gear 78 which may be made of a suitable material such as aluminum or the like and which meshes with gear 79 mounted on shaft 56 and which in turn is made of a suitable material such as nylon. Shaft 56 is the threaded shaft which causes the shifting of slide block 53 and is journaled in plates 18 and 12 as shown. The end of the shaft has a pin-like bearing projection which engages the threaded stud 80 which is extended through a tapped opening in plate 12 so as to serve as a thrust bearing to hold the shaft 56 in proper operating position. Gear 79, in turn, meshes with pinion 81 mounted on shaft 50, which is made of suitable material such as stainless steel. Shaft 50 has a similar bearing pin projecting from the right-hand end thereof, as viewed in FIG. 2, which engages against the end of threaded stud 82 which extends through the tapped opening in plate 12 serving as a thrust bearing to hold shaft 50 in proper operating position.

The gears 78 and 79 have 1–1 ratio to each other so that when crank 74 is rotated shaft 56 will rotate at the same rate as shaft 76 but in an opposite direction thereto. The ratio of gear 79 to pinion 81 is 5–1 so that when crank 74 is rotated shaft 50 will rotate in the same direction as shaft 76 but at five times the rate of rotation of crank 74. Thus, it will be seen that when crank 74 is rotated in one direction measuring drum 48 will be rotated in a direction to wind a measured length of filament thereon while the same measured length of filament is unwound from rewind drum 49 with the result that a measured length of filament is drawn into the liquid chamber 23 causing displacement of a volumetric quantity of liquid equal to the volumetric quantity of the wire drawn into the chamber.

When the crank is rotated in the opposite direction, a measured length of filament is wound on rewind drum 49 while a similar length is unwound from measuring drum 48 with the result that a volumetric quantity of liquid precisely equal to the volumetric quantity of the filament removed from the liquid chamber can be drawn into the liquid chamber. During this operation, the filament in its path of travel between the drums passes through the guide channel 42 in plate 22 and the passageway 60 in slide 53 in sliding-sealing engagement with the packing material so as to prevent loss of liquid and contamination of the liquid in the chamber. From the passageway the filament passes over pulley 68 and thence through guide channel 66 and 67 into rewind chamber 46. During this operation, the filament is maintained under sufficient tension by the partial compression of helical spring 71 so as to ensure uniform accumulation of the filament on the drums without any slack. Simultaneously with this operation, the rotation of shaft 56 causes the shifting of slide block 53. When the filament is being drawn into the liquid chamber, the slide block shifts to the left. When it is drawn into the rewind chamber, the slide block shifts to the right, as viewed in FIG. 2. Thus, the filament is guided into winding on the drums in helical, non-overlapping turns.

A sufficient length of filament is provided so as to be able to displace the maximum quantity of liquid that it is desired to dispense from the liquid chamber or that it is desired to be drawn therein. For most purposes, I have found that it is adequate to dispense or accumulate no more than 30 microliters. At the representative dimensions previously given, namely 0.006 inch dimeter for the wire and 0.6865 inch diameter for the drum, this would require 30 turns of the shaft 50 and drum 23, which is accomplished by rotating crank 74 six times. Thus, 60 inches of effective length of filament are required plus the additional amount required for attachment to the drums and for extending outwardly through the guide mechanism and around pulley 68, plus a small surplus to prevent tensioning the wire or filament beyond its elastic limit. Each rotation of shaft 50 so as to wind one turn on measuring drum 48 results in dispensing one microliter of liquid from the liquid chamber. Each rotation of the shaft in the opposite direction results in drawing one microliter of liquid into the liquid chamber. Since each rotation of crank 74 results in five rotations of shaft 50 five microliters will be dispensed from or drawn into the liquid chamber upon each rotation of the crank.

In order to prevent over-tensioning of the filament beyond its elastic limit or withdrawal of the end of the filament from one of the drums, I provide stop mechanism on shaft 76 so as to limit the rotation of the shaft to six rotations in either direction. This stop mechanism comprises a collar 84 which is clamped to the shaft by set screw 85 and having a pin 86 projecting laterally inwardly therefrom, as shown most clearly in FIG. 8. Immediately adjacent collar 84 and mounted on shaft 76 so that they can freely rotate thereon are a plurality of similar locking rings 87, each of which is formed with a laterally projecting lug 88. The lugs project to the left, as viewed in FIG. 2, and are arranged to overlap the next adjacent ring and to engage the lug on that ring when rotating to a position of abutting relationship. The pin 86 on collar 84 is in the path of movement of the lug of the first locking ring. The lug on the last locking ring is disposed in the path of movement of stop member 89 formed on bracket 77. Thus, upon rotation of crank 74 in a clockwise direction, as viewed from the right-hand side of FIG. 2, pin 86 engages the first lug 88 and causes it to rotate into engagement with the next lug 88, and this process continues until the last lug engages the fixed stop 89. This is the ultimate limit of movement in a clockwise direction, and the crank cannot be rotated any further.

When crank 74 is rotated in an anti-clockwise direction, as viewed from the right-hand end of FIG. 2, a pin 86 will then rotate in the opposite direction until it engages the opposite side of the first lug 88, and the same procedure continues in a reverse direction until the ultimate stop is reached. Each lock ring permits a rotation of 270° before the lug of the next lock ring is engaged with the result that the crank 74 and shaft 76 may be rotated through six revolutions in either direction.

I also preferably provide a suitable indicator which may be calibrated to indicate either the quantity of liquid dispensed or the length of wire drawn into the liquid chamber or the calibrations may be converted on the indicator to show the bore diameter of the tubing 36 being gauged or tested therein.

In the illustrated embodiment, I have shown an indicator which registers the volumetric quantity of liquid dispensed from the liquid chamber in microliters and hundredths of microliters. Thus, I have shown a first indicator drum 92 which is mounted on and keyed to shaft 50 and which is calibrated in hundredths of microliters from 0.01 microliter to 1.00 microliter. In other words, one-half a rotation of shaft 50 will indicate that 0.50 microliter have been dispensed and a full rotation will indicate that one microliter has been dispensed.

Also mounted on shaft 50 is pinion 93 which meshes with gear 94 mounted on shaft 95. Mounted on shaft 95 immediately adjacent the gear 94 is pinion 96 which meshes with gear 97 on the second indicator drum 98. The gearing ratio between pinion 93, gear 94, pinion 96 and gear 97 is such as to cause one full rotation of drum 98 upon ten rotations of shaft 50. The calibrations on the second indicator drum 98 indicate unit volume quantities of liquid dispensed in microliters from one to ten. Upon one rotation of shaft 50 and of first indicator drum 92, the second indicator 98 will execute one-tenth of a turn. Stub shaft 95' is journaled in one of the supporting plates, as for instance, plate 30 and pinion 99 is mounted thereon. As shown most clearly in FIG. 7, the pinion 99 is formed with relatively wide teeth and relatively narrow teeth in alternate relationship. Drum 98 carries a single tooth 98' on the side thereof and this tooth meshes with the wider teeth of pinion 99. Pinion 99 has four of the wider teeth and four of the narrower teeth so that upon each rotation of drum 98, pinion 99 is rotated through one-quarter turn. All of the teeth on pinion 99, including both the narrow and the wide teeth engage with the teeth on drum 101. The ratio between pinion 99 and the gear 100 on drum 101 is 2½:1, i.e., pinion 99 has eight teeth in all and gear 100 has twenty teeth. Thus, when pinion 99 makes two-and-a-half revolutions, gear 100 and drum 101 will make one revolution. Thus, the ratio between drum 98 and drum 100 is ten to one and when drum 98 makes one revolution, drum 101 will make one-tenth of a revolution. Drum 101 is calibrated in ten microliters, from ten microliters up to one hundred microliters.

Thus, upon rotation of the crank to wind the filament upon measuring drum 48 the indicator is caused to operate to indicate one microliter of liquid displaced from the liquid chamber for each rotation of the drum from one microliter to thirty microliters. As shown in FIGS. 2 and 7, the filament is disposed half on one drum and half on the other with the result that the indicator in these figures registers fifteen microliters.

In using the device as indicated in FIGS 1 and 4 to measure the bore size or capacity of capillary tubing 36 or some other instrument, liquid is drawn into the chamber 23 and the capillary tubing 36 is inserted in the opening in the sealing collar 35 of the discharge passageway and the magnifying glass 40 is rotated into position so that the calibrations 39 can be clearly viewed. It is then necessary to rotate the crank so that all of the effective length of the filament is on rewind drum 49 and so that the indicator drums register zero microliters. The mechanism is then adjusted by means of the compensating mechanism to raise the liquid level in the liquid chamber discharge passageway and tubing 36 to the zero calibration mark 39 at the lower end of gauge 38. This is accomplished by rotating the knurled handle 104 on the side of the casing to the right so as to drive the piston 105 inwardly into the auxiliary liquid chamber 106 which is connected by duct 107 to the liquid discharge passageway 34 and the liquid chamber 23. By rotating the knurled handle to the right or to the left, the liquid level can be raised to the zero mark 39 at the bottom of gauge 38.

Thereafter, crank 74 is rotated so as to wind a measured length of the filament on to the measuring drum 48 in liquid chamber 23, thereby displacing the volumetric quantity of liquid upwardly into the capillary tubing exactly equal to the volumetric quantity of the filament drawn into the chamber. When the liquid level in the capillary tubing is rasied to the upper graduation 39 on gauge 38, the reading on the indicator dials is then taken. The dials will register the exact quantity in microliters and hundredths of microliters which are contained in the tubing between the upper and lower graduations.

The graduations are spaced an exact distance apart, as for instance one inch. In this manner the bore diameter of the tubing can be readily computed. If desired, the calibrations on the indicator dials can be immediately measured in bore diameter rather than in volumetric quantities.

Referring back to the compensating mechanism, it will be seen that knurled handle 104 is mounted on a shaft 108 journaled in plates 12, 16 and 20. The end of the shaft is formed with a non-circular portion 109 which is rectangular in configuration in the illustrated embodiment and which engages a similarly shaped socket in the sleeve portion 110 so as to have relative longitudinal slide motion with respect thereto but so that they rotate together. The upper end of the sleeve member is formed with an externally threaded collar 111 which has threaded engagement with the bore 112. The piston 105 is mounted at the end of the sleeve member. Accordingly, rotation of the handle 104 causes longitudinal shifting of the piston in a direction dependent upon the direction of rotation. The piston has tight engagement with the inner wall's auxiliary liquid chamber 108, as shown, and in order to prevent leakage O-rings 114 and 115 may be provided in the plates 28 and 26 in grooves provided for this purpose.

Under certain circumstances, where large variations in temperature are encountered which might affect the diameter of drums 48 and 49, I may use a drum, as shown in FIG. 9, which automatically compensates for variations in temperature. The drums 48 and 49, as well as the drum 120 shown in FIG. 9, are made of a suitable non-corrosive metal such as brass, bronze, aluminum or stainless steel having a relatively high coefficient of thermal expansion. The drum shown at 120 in FIG. 9 is provided with a hollow portion 121 extending through approximately a one-quarter segment thereof which is overlapped by an integral arcuate flange portion 122. On the inner surface of flange portion 122, I provide a metal lining 123 having a relatively low coefficient of expansion compared to the metal from which the drum is made. For this purpose, I may employ metals or metal alloys such as nickel steel alloys similar to Invar used in various bi-metallic temperature sensitive devices. Thus, upon an increase in the temperature which would cause an expansion in the diameter of the drum the relative differences in the coefficient of expansion causes the arcuate flange 122 to curl inwardly compensating for any thermal expansion.

An inital manual adjustment of the diameter or circumference of the drum can also be accomplished by the mechanism shown at the lower portion of the drum in FIG. 9. Thus, a slit 124 has been extended across a portion of the lower segment of the drum and a threaded tapered adjustment screw 125 is engaged with a threaded aperture extending longitudinally of the drum.

By threading the screw inwardly, the diameter and circumference of the drum is expanded to the desired initial size. By threading it outwardly, it is reduced to the desired initial size. Thereafter, the diameter and circumference of the drum will remain uniform in spite of thermal changes in view of the thermal compensator.

It will thus be seen that I have provided an improved apparatus and method for making accurate micro-measurements and for dispensing accurately measured, small quantities of liquids in which the apparatus is of relatively simple design and is simple to use and operate to accurately measure or dispense micro-quantities of liquids. It will be seen that the device is of rugged construction so as to give prolonged service with repeated operations with comparative freedom from wear.

I claim:
1. The method of accurately dispensing measured small quantities of a liquid held in a chamber with a liquid discharge passageway having an inlet communicating with the chamber and thru which liquid from the chamber can enter the discharge passageway and an outlet for egress of measured small quantities of liquid and with a filament guide channel having an inlet thru which may be drawn an accurately measured length of an elongated flexible relatively inelastic filament made of a material unaffected by the liquid and having substantially uniform cross-sectional dimensional characteristics throughout its effective length, and having an outlet communicating with the chamber and through which the wire can enter the chamber which comprises: drawing the filament through the inlet of the filament guide channel; simultaneously frictionally engaging the filament in the guide channel by providing channel dimensions effectively smaller than the diameter of the wire so that it is in sealing-wiping relationship therewith; subjecting the filament to a uniform tension below the elastic limit of the filament as it is drawn thru the guide channel; drawing into the chamber through the outlet of the filament guide channel and accumulating therein an accurately measured length of filament thereby simultaneously displacing liquid from the chamber into the discharge passageway; and passing from the outlet of the discharge passageway a volumetric quantity of liquid exactly equal to the volumertic quantity of the measured length of filament drawn into the chamber.

2. Apparatus useful for making accurate micro-measurements and for dispensing accurately measured small quantities of liquid comprising: means providing a chamber for holding a quantity of liquid and formed with a liquid discharge passageway extending from the inside to the outside of the chamber and also formed with a guide channel extending from the outside to the inside of the chamber; an elongated, flexible relatively inelastic filament made of a material unaffected by the liquid and having substantially uniform cross-sectional dimensional characteristics throughout its effective length extending through said guide channel in sealing, wiping engagement therewith to prevent loss of liquid from the chamber and also to prevent contaminants from entering the chamber through the channel from the outside, a portion of said filament being disposed inside said chamber and another portion of said filament being disposed outside said chamber; and filament feeding means including a first drum-like reel inside said chamber on which one end portion of said filament is mounted, a second drum-like reel outside said chamber on which another end portion of the filament is mounted, means for rotating said second reel to accumulate said filament thereon and withdraw it from the chamber and means for rotating said first reel to feed accurately measured lengths of said filament into said chamber and accumulate it on said first reel so as to displace a volumetric quantity of liquid from said chamber corresponding exactly to the volumetric quantity of the accurately measured length of filament.

3. Apparatus useful for making accurate micro-measurements and for dispensing accurately measured small quantities of liquid as set forth in claim 2 which includes an indicator operatively connected to the filament feeding means for giving an indication of the quantitative liquid displacement resulting from feeding measured lengths of said filament into said chamber and accumulating said lengths therein.

4. Apparatus useful for making accurate micro-measurements and for dispensing accurately measured small quantities of liquid as set forth in claim 2 which includes filament guiding means between said drums which is shifted longitudinally of said drums when they are rotated to guide said filament on said drums so that it is accumulated thereon in non-overlapping relationship.

5. Apparatus useful for making accurate micromeasurements and for dispensing accurately measured small quantities of liquids as set forth in claim 2 in which both drums are mounted on a common shaft, the filaments are wound on said drums in opposite relationship and means are provided for rotating said shaft in opposite directions to feed accurately measured lengths of filament into and out of said chamber and accumulate the filament on said drums.

6. Apparatus useful for making accurate micromeasurements and for dispensing accurately measured small quantities of liquids as set forth in claim 2 in which said filament is a metallic wire.

7. Apparatus useful for making accurate micromeasurements and for dispensing accurately measured small quantities of liquids comprising: means providing a chamber for holding a quantity of liquid and formed with a liquid discharge passageway extending from the inside to the outside of the chamber and also formed with a guide channel having packing material therein extending from the outside to the inside of the chamber; an elongated, flexible, relatively inelastic filament made of a material unaffected by the liquid and having substantially uniform cross-sectional dimensional characteristics throughout its effective length extending through said guide channel in sealing, wiping engagement with the packing material to prevent loss of liquid from the chamber and also to prevent contaminants from entering the chamber through the channel from the outside, a portion of said filament being disposed inside said chamber and another portion of said filament being disposed outside said chamber; filament feeding means including a shaft extending from outside to the inside of said chamber, a first drum-like reel mounted on said shaft inside said chamber on which one end portion of said filament is mounted, a second drum-like reel mounted on said shaft outside said chamber on which another end portion of the filament is mounted, means for rotating said shaft in opposite directions so that when the shaft is rotated in one direction the filament is accumulated on the second reel and is withdrawn from the chamber and when it is rotated in the opposite direction the filament is accumulated on the first reel and is fed into the chamber in accurately measured lengths so as to displace a volumetric quantity of liquid from said chamber corresponding exactly to the volumetric quantity of the accurately measured length of filament; filament guiding means mounted in the path of said filament between said drums and which is shifted longitudinally of said drums when they are rotated to guide said filament on said drums so that it is accumulated thereon in non-overlapping relationship; and indicator means operatively connected to the filament feeding means for giving an indication of the quantitative liquid displacement resulting from feeding measured lengths of said filament into said chamber and accumulating said filament on said first reel.

8. Apparatus useful for making accurate micromeasurements and for dispensing accurately measured small quantities of liquid, as set forth in claim 7 in which the filament guiding means includes a guide pulley around which the filament is disposed and which is spaced from said first and second drum-like reels and spring means are provided so as to resiliently urge the pulley away from the reels to place the filament under a tension less than the elastic limit thereof.

9. Apparatus useful for making accurate micromeasurements and for dispensing accurately measured small quantities of liquid, as set forth in claim 7, in which the filament guiding means includes a slide block immediately adjacent the means providing the liquid chamber and a portion of the guide channel is disposed in the said last mentioned means and another portion extends through said slide block and with said last mentioned means also having a plastic sealing block surrounding the guide channel in contact with the side block and with the packing material being disposed in the portion of the guide channel which extends through the slide block.

10. Apparatus useful for making accurate micromeasurements and for dispensing accurately measured small quantities of liquid, as set forth in claim 7, which includes operating mechanism for rotating the shaft of the filament feeding means and also stop mechanism for limiting the number of rotations of said shaft in either direction so as to stop the rotation of the shaft before the filament is stretched beyond its elastic limit or the ends of the filament are detached from the drum-like reels.

References Cited by the Examiner

UNITED STATES PATENTS

| | | | |
|---|---|---|---|
| 903,196 | 11/1908 | Johnson | 222—319 X |
| 1,017,847 | 2/1912 | Carl | 103—72 |
| 2,153,666 | 4/1939 | Hill et al. | 242—56.9 |
| 2,236,583 | 4/1941 | Selvig | 73—149 X |
| 2,344,771 | 3/1944 | Halliburton | 73—149 |
| 2,508,547 | 5/1950 | Slonczewski | 73—1 X |
| 2,628,493 | 2/1953 | Sandefur | 73—1 |
| 2,998,938 | 9/1961 | Wettering | 242—55.12 |
| 3,136,455 | 6/1964 | Coe | 222—319 |

FOREIGN PATENTS

| | | |
|---|---|---|
| 1,086,141 | 8/1954 | France. |
| 276,157 | 7/1930 | Italy. |

RAPHAEL M. LUPO, *Primary Examiner.*